United States Patent
Highgate

(10) Patent No.: US 8,460,832 B2
(45) Date of Patent: Jun. 11, 2013

(54) METHOD OF PERFORMING ELECTROCHEMICAL REACTION

(75) Inventor: Donald James Highgate, Surrey (GB)

(73) Assignee: ITM Power (Research) Limited, South Yorkshire (GB)

( * ) Notice: Subject to any disclaimer, the term of this patent is extended or adjusted under 35 U.S.C. 154(b) by 54 days.

(21) Appl. No.: 12/890,204

(22) Filed: Sep. 24, 2010

(65) Prior Publication Data

US 2011/0011748 A1  Jan. 20, 2011

Related U.S. Application Data

(62) Division of application No. 10/579,658, filed as application No. PCT/GB2004/005347 on Dec. 20, 2004, now abandoned.

(30) Foreign Application Priority Data

Dec. 19, 2003 (GB) .................................. 0329459.2

(51) Int. Cl.
*H01M 8/00* (2006.01)
*C25B 1/10* (2006.01)

(52) U.S. Cl.
USPC .......................................... 429/400; 205/628

(58) Field of Classification Search
USPC .......................................... 205/628; 429/400
See application file for complete search history.

(56) References Cited

U.S. PATENT DOCUMENTS

| 3,370,984 | A | | 2/1968 | Platner | |
|---|---|---|---|---|---|
| 3,492,163 | A | * | 1/1970 | Hilmer | 429/505 |
| 3,748,179 | A | | 7/1973 | Bushnell | |
| 3,925,332 | A | * | 12/1975 | Naito et al. | 525/344 |
| 3,992,223 | A | | 11/1976 | Gutbier | |
| 2002/0100681 | A1 | * | 8/2002 | Kirk et al. | 204/263 |

FOREIGN PATENT DOCUMENTS

| JP | 01251560 | 10/1989 |
|---|---|---|
| WO | WO 03/023890 | 3/2003 |

* cited by examiner

*Primary Examiner* — Karie O'Neill Apicella

(74) *Attorney, Agent, or Firm* — Saliwanchik, Lloyd & Eisenschenk

(57) ABSTRACT

A method of performing an electrochemical reaction in an electrochemical cell comprising electrodes separated by a hydrophilic ion-exchange membrane, comprises conducting the reaction in the presence of an aqueous solution of an electrolyte of which the concentration is controlled.

7 Claims, No Drawings

METHOD OF PERFORMING ELECTROCHEMICAL REACTION

CROSS REFERENCE TO A RELATED APPLICATION

This application is a divisional application of U.S. application Ser. No. 10/579,658, filed Feb. 5, 2007 now abandoned; which is a National Stage Application of International Application No. PCT/GB2004/005347, filed Dec. 20, 2004; which claims priority to Great Britain Application Nos. 0329459.2, filed Dec. 19, 2003; which are incorporated herein by reference in their entirety.

FIELD OF THE INVENTION

This invention relates to a method of performing an electrochemical reaction.

BACKGROUND TO THE INVENTION

Electrochemical cells exist in which the electrodes are separated by an ion-exchange membrane, for example a solid polymer electrolyte.

WO-A-03/23890 teaches that ion-exchange materials can be produced based on hydrophilic polymers, i.e. polymers which are inherently able to absorb and transmit water throughout their molecular structure. The materials are particularly relevant to hydrogen-oxygen fuel cells, since product water can be redistributed, thereby avoiding local flooding or drying-out of the membrane. There are essentially three ways in which a hydrophilic material can be rendered ionically conducting.

The first way is to form ionically active sites by co-polymerisation from a solution of ionically active monomers; this methodology is described in WO-A-03/23890. A strongly anionic or cationic moiety is formed in the resulting polymer, allowing it to function as a anionic-exchange (AE) or cationic-exchange (CE) material respectively.

The second way is to incorporate ionically active sites in the material by grafting ionically active monomers. An example of such a material is Nafion, which becomes ionically conducting when the ionic sites are activated by hydration in demineralised water.

The third way is by hydration of the hydrophilic material in an acidic or alkaline liquid. Hydrophilic materials such as HEMA (2-hydroxyethyl methacrylate) and MMA-VP (methyl methacrylate-vinylpyrrolidone) possess no intrinsic electrical properties and, if hydrated in deionised distilled (DD) water, are good electrical resistors. If, however, these materials are hydrated in an acidic or alkaline solution, they become good conductors. A limitation of this approach is that conductivity declines as the electrolyte solution washes out, the material eventually becoming electrically inactive. Such washing out is particularly problematic in electrolysers, where reactant water is normally present in large quantities, and in hydrogen-oxygen fuel cells, where water is produced.

SUMMARY OF THE INVENTION

The present invention addresses the limitations of the third approach and is based on a realisation that, provided the concentration of the electrolyte in the membrane can be maintained, a electrically inactive membrane hydrated with an electrolyte is a viable alternative to other hydrophilic systems. Similarly, the conductivity of a weakly ionic hydrophilic membrane can be augmented by hydrating the membrane in an acidic or alkaline solution. The concentration of the electrolyte can be maintained by controlling, for example, the extent of hydration of the membrane.

According to the invention, a method of performing an electrochemical reaction in an electrochemical cell comprising electrodes separated by a hydrophilic ion-exchange membrane, comprises conducting the reaction in the presence of an aqueous solution of an electrolyte of which the concentration is controlled.

DESCRIPTION OF PREFERRED EMBODIMENTS

The cell may be in the form of a fuel cell or an electrolyser. In the case of a fuel cell running on hydrogen and oxygen, water is produced in the cell reaction. It follows that sufficient quantities of water must be removed from the membrane, in order to maintain the concentration of the electrolyte. In cases such as this, i.e. where water needs to be removed from the system, removal is preferably accomplished by evaporation. Evaporation can be achieved by using a Peltier cooled "cold spot" located away from the membrane, at which moisture from the warm cell condenses and is removed. For a cell in which water is consumed, e.g. an electrolyser, the extent of hydration can be controlled by limiting the amount of water introduced into the cell. The extent of hydration can be assessed, for example, by monitoring the pH of the membrane during use.

The hydrophilic material may be ionically inactive, i.e. it possesses no intrinsic electrical properties. In this case, ionic activity is conferred to the material by the electrolyte solution. Alternatively, the hydrophilic material may be ionically active, comprising anionic or cationic sites within its structure. Here, the aqueous electrolyte augments the ionic activity of the hydrophilic material. The invention has particular applicability to weakly active materials. Weakly active materials are those which, when hydrated in DO water, exhibit ionic conductivities which are less than 60%, typically 50%, of that of an industry standard material such as Nafion 117.

The hydrophilic, material may be obtained using any suitable method known in the art. For example, an ionically active material may formed by according to the techniques described in WO-A-03/23890, the contents of which are incorporated in by reference. The material is preferably a hydrophilic polymer, obtainable by the (co)polymerisation of monomers such as methyl methacrylate, N-vinyl-2-pyrrolidone or acrylonitrile, and is preferably crosslinked.

The electrolyte solution may be acidic or alkaline. Examples of suitable electrolytes include toluenesulphonic acid (TSA), vinylsulphonic acid, acrylamido-(2-methyl)propanesulphonic acid (AMPSA), sodium hydroxide or potassium hydroxide.

The electrochemical cell is preferably in the form of a membrane-electrode assembly (MEA) or stack of MEAs. MEAs and methods for manufacture are well known in the art. In particular, WO-A-03/23890 describes a "one-step" method for the production of MEAs, which involves forming the membrane by polymerisation in situ.

The following Examples illustrate how the conductivity of a hydrophilic ion-exchange membrane can be controlled, as in the present invention.

EXAMPLE 1

A crosslinked hydrophilic polymer was formed by irradiating a mixture containing 35% acrylonitrile, 35% N-vinyl-2-pyrrolidone, 5% allyl methacrylate and 25% deionised distilled water with a dose of 2 megarads in a cobalt 60 source. The resulting solid polymer was divided into two samples. The first sample was hydrated in water and its electrical conductivity measured using an AC bridge method. The second sample was hydrated in a solution of 10% by weight TSA in water, after which its electrical conductivity was measured in the same test cell as used for the first sample.

The conductivity of the second sample was shown to be greater than that of first sample, in the ratio of 5.7:0.07, i.e. 81.4. The conductivity of the second sample was also found to be 36% greater than that of a Nafion 117 membrane.

The second sample was then immersed in an excess of DD water for a period of 14 days, after which its electrical conductivity was measured. The "residual" conductivity was found to be only 15% of its initial conductivity, demonstrating that substantial loss of TSA had occurred. Subsequent measurements demonstrated a continuing decline in conductivity with time of washing in DD water. Conductivity was recovered by the addition of further TSA to the membrane, so that the original pH was restored.

EXAMPLE 2

A crosslinked hydrophilic polymer was formed by irradiating a mixture containing 24% methyl methacrylate, 72% N-vinyl-2-pyrrolidone and 4% allylmethacrylate with a dose of 2 megarads in a cobalt 60 source. The resulting solid polymer was divided into two samples. The first sample was hydrated in water and its electrical conductivity measured using an AC bridge method. The second sample was hydrated in a solution of 10% by weight TSA in water, after which its electrical conductivity was measured in the same test cell as used for the first sample.

The conductivity of the second sample was shown to be greater than that of first sample, in the ratio of 47.6:0.05, i.e. 952. The conductivity of the second sample was also found to be 13% greater than that of a Nafion 117 membrane.

The second sample was then immersed in an excess of DD water for a period of 14 days and after which its electrical conductivity was measured. The "residual" conductivity was found to be only 12% of its initial conductivity, demonstrating that substantial loss of TSA had occurred. Subsequent measurements demonstrated a continuing decline in conductivity with time of washing in DD water. Conductivity was recovered by the addition of further TSA to the membrane, so that the original pH was restored.

I claim:

1. A method of performing an electrochemical reaction in which water is converted into hydrogen and oxygen, in an electrochemical cell comprising electrodes separated by a hydrophilic membrane which is ionically inactive or weakly ionically active, wherein the reaction is conducted in the presence of an aqueous solution of an electrolyte of which the concentration is controlled by introducing water into the cell, wherein the reaction converts water into hydrogen and oxygen, and wherein the membrane comprises a hydrophilic material.

2. The method according to claim 1, wherein the electrolyte is toluenesulphonic acid, vinylsulphonic acid, acrylamido-(2-methyl)propanesulphonic acid, sodium hydroxide or potassium hydroxide.

3. The method according to claim 1, wherein the hydrophilic material is a polymeric material.

4. The method according to claim 3, wherein the hydrophilic material is obtainable by the polymerisation of monomers including methyl methacrylate, N-vinyl-2-pyrrolidone or acrylonitrile.

5. The method according to claim 3, wherein the hydrophilic material is cross-linked.

6. The method according to claim 1, wherein the cell is in the form of a membrane-electrode assembly (MEA), or a stack of MEAs.

7. The method according to claim 1, wherein the concentration is controlled by the addition of further electrolyte.

* * * * *